US007678985B2

(12) United States Patent
Adams et al.

(10) Patent No.: US 7,678,985 B2
(45) Date of Patent: Mar. 16, 2010

(54) STANDALONE ELECTRONIC MODULE FOR USE WITH MUSICAL INSTRUMENTS

(75) Inventors: Charles C. Adams, Gilbert, AZ (US); Dale V. Curtis, Scottsdale, AZ (US); Jeremy A. Brieske, Denver, CO (US); Lawrence E. Lorenzen, Phoenix, AZ (US)

(73) Assignee: Fender Musical Instruments Corporation, Scottsdale, AZ (US)

( * ) Notice: Subject to any disclaimer, the term of this patent is extended or adjusted under 35 U.S.C. 154(b) by 289 days.

(21) Appl. No.: 11/784,372

(22) Filed: Apr. 6, 2007

(65) Prior Publication Data

US 2007/0234880 A1 Oct. 11, 2007

Related U.S. Application Data

(63) Continuation-in-part of application No. 11/400,472, filed on Apr. 6, 2006, now Pat. No. 7,326,849.

(51) Int. Cl.

| | |
|---|---|
| ***G10G 7/02*** | (2006.01) |
| ***G10G 3/04*** | (2006.01) |
| ***G10H 1/32*** | (2006.01) |
| ***G10H 7/00*** | (2006.01) |
| ***G06F 17/00*** | (2006.01) |

(52) U.S. Cl. ............................ 84/645; 84/454; 84/462; 84/644; 700/94; 381/98; 381/118; 381/119; 381/123; 361/728

(58) Field of Classification Search .................. 84/737, 84/721, 746, 454, DIG. 18, 743, 645, 462, 84/644; 381/118, 119, 120, 61, 334, 386, 381/388, 306, 98, 123; 700/94

See application file for complete search history.

(56) References Cited

U.S. PATENT DOCUMENTS 4,509,190 A 4/1985 Spector (Continued)

OTHER PUBLICATIONS

ToneWorks Korg, Pandora PX3 Personal Effects Processor for Guitar, Lorg. 2 page, downloaded Jan. 11, 2005.

(Continued)

*Primary Examiner*—Jeffrey Donels
*Assistant Examiner*—Andrew R Millikin
(74) *Attorney, Agent, or Firm*—Robert D. Atkins

(57) ABSTRACT

An electronic module has an enclosure which is mechanically and electrically compatible with a plurality of receiving devices such as amplifiers, computers, mixer consoles, and musical instruments. The module has a programmable control panel and display on the enclosure and an electronic circuit disposed within the enclosure and receiving user commands from the control panel and displaying configuration information on the display. The electronic circuit performs a variety of functions for each of the receiving devices by way of a digital signal processor, synthesizer for generating a programmable audio signal in response to a data stream, storage device for storing musical information in a digital format, and playback device for retrieval and playback of the stored musical information. An audio output is coupled for transferring the programmable audio signal to or from the receiving device.

13 Claims, 11 Drawing Sheets

U.S. PATENT DOCUMENTS

| | | | |
|---|---|---|---|
| 4,995,084 | A | 2/1991 | Pritchard |
| 5,009,146 | A | 4/1991 | Manabe et al. |
| 5,133,014 | A | 7/1992 | Pritchard |
| 5,578,689 | A | 11/1996 | Nogues et al. |
| 5,740,260 | A | 4/1998 | Odom |
| 5,789,689 | A | 8/1998 | Doidic et al. |
| 5,877,443 | A | 3/1999 | Arends et al. |
| 6,218,602 | B1 | 4/2001 | Davis et al. |
| 6,353,169 | B1 | 3/2002 | Juszkiewicz et al. |
| 6,640,257 | B1 | 10/2003 | MacFarlane |
| 6,686,530 | B2 | 2/2004 | Juszkiewicz et al. |
| 2002/0065568 | A1 | 5/2002 | Silfvast et al. |
| 2004/0069121 | A1 | 4/2004 | Georges |
| 2004/0103776 | A1 | 6/2004 | Juszkiewicz et al. |
| 2004/0144241 | A1 | 7/2004 | Juskiewicz et al. |
| 2006/0064186 | A1 | 3/2006 | Ryle et al. |

OTHER PUBLICATIONS

Boss JS-5 JamStation Backing Machine with Audio Track, Electric City Music, 8 pages, downloaded Jan. 11, 2005.
QY100 Music Sequencer, Yamaha Corporation of America, 8 pages, downloaded Jan. 11, 2005.
TASCAM's CD-GT1, Tascam, 2 pages, downloaded Jan. 11, 2005.
SUMO Digital Karaoke System, Karaoke.com, 3 pages, downloaded Jan. 25, 2006.
Karaoke Machine, 12 pages, downloaded Jan. 25, 2006.

STANDALONE ELECTRONIC MODULE FOR USE WITH MUSICAL INSTRUMENTS

CLAIM TO DOMESTIC PRIORITY

The present invention is a continuation-in-part application of U.S. patent application Ser. No. 11/400,472, entitled "Foot-Operated Docking Station for Electronic Modules Used with Musical Instruments" and claims priority to the foregoing parent application pursuant to 35 U.S.C. §120.

CROSS REFERENCE TO RELATED APPLICATIONS

The present application is related to U.S. patent application Ser. No. 11/036,505, entitled "Portable Multi-Functional Audio Sound System and Method Therefor", filed on Jan. 14, 2005.

FIELD OF THE INVENTION

The present invention relates in general to electronic modules and, more particularly, to a standalone electronic module for use with musical instruments and associated external equipment.

BACKGROUND OF THE INVENTION

Musical instruments have always been very popular in society—providing entertainment, social interaction, self-expression, and a business and source of livelihood for many people. String instruments are especially popular because of their active playability, tonal properties, and portability. String instruments are fun and yet challenging to play and have great sound qualities.

Guitars are one type of string musical instrument. The musical artist, or user, plays the guitar by using his or her fingers, or a guitar pick, to displace one or more of the tightly-strung strings from a neutral position and then releasing it, causing the string to vibrate as it returns to its neutral position. The vibrating string produces the desired sound. The guitar pick offers certain advantages over the fingers in terms of sharpness of the string vibration and clarity of the note played.

In the case of electric guitars, the string vibration is sensed by electromagnetic pickups which detect the string movement in an electric field and produce electrical signals representative of the string movement. The electric signals are routed to an external amplifier and speaker system which produces the sound.

The external equipment may contain one or more electronic circuits for modifying or enhancing the sound. For example, an effects processor can be used to enhance and adjust the acoustic qualities for the instrument. Other electronic circuits can provide filtering, synthesis, signal conditioning, signal distribution, signal conversion, and signal processing.

The external signal processing is typically built into the individual equipment and not readily transferable between systems. Each type of external equipment is dedicated for its intended function, e.g., the amplifier performs amplification, the effects module controls effects, and the synthesizer generates sounds. Yet, while each type of external equipment performs the specific function each was designed for, none provide the flexibility or convenience in moving signal processing capability between systems. The dedicated design of each type of external equipment increases capital costs, reduces system integration, and in some cases duplicates features.

SUMMARY OF THE INVENTION

A need exists for a multifunction electronic module which enhances the performance of musical instruments and associated external equipment.

In one embodiment, the present invention is an electronic module for use in conjunction with a musical instrument comprising an enclosure with connector adapted for insertion into a receptacle of a receiving device. A programmable control panel and display is disposed on the enclosure. An electronic circuit is disposed within the enclosure and receiving user commands from the control panel and displaying configuration information on the display. The electronic circuit has a digital signal processor for performing signal processing on a data stream, a synthesizer for generating a programmable audio signal in response to the data stream, a storage device coupled to the digital signal processor for storing musical information in a digital format, and a playback device for retrieval and playback of the stored musical information.

In another embodiment, the present invention is a system for use in conjunction with a musical instrument comprising an electronic module having an enclosure which is mechanically and electrically compatible with a plurality of receiving devices. The electronic module has a programmable control panel and display on a front portion of the enclosure. The electronic module further includes an electronic circuit disposed within the enclosure and receiving user commands from the control panel and displaying configuration information on the display. The electronic circuit performs a plurality of functions for each of the plurality of receiving devices.

In another embodiment, the present invention is an electronic module for use in conjunction with a musical instrument comprising an enclosure with a connector adapted for providing electrical communication with a receiving device. A programmable control panel and display is disposed on the enclosure. An electronic circuit is disposed within the enclosure and receiving user commands from the control panel and displaying configuration information on the display. The electronic circuit performs a plurality of functions for the receiving device via the connector.

In another embodiment, the present invention is a method of manufacturing an electronic module for use in conjunction with a musical instrument comprising the steps of providing an enclosure with a connector adapted to providing electrical communication with a receiving device, the enclosure including a programmable control panel and display, and disposing an electronic circuit within the enclosure, the electronic circuit receiving user commands from the control panel and displaying configuration information on the display and performing a plurality of functions for the receiving device.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
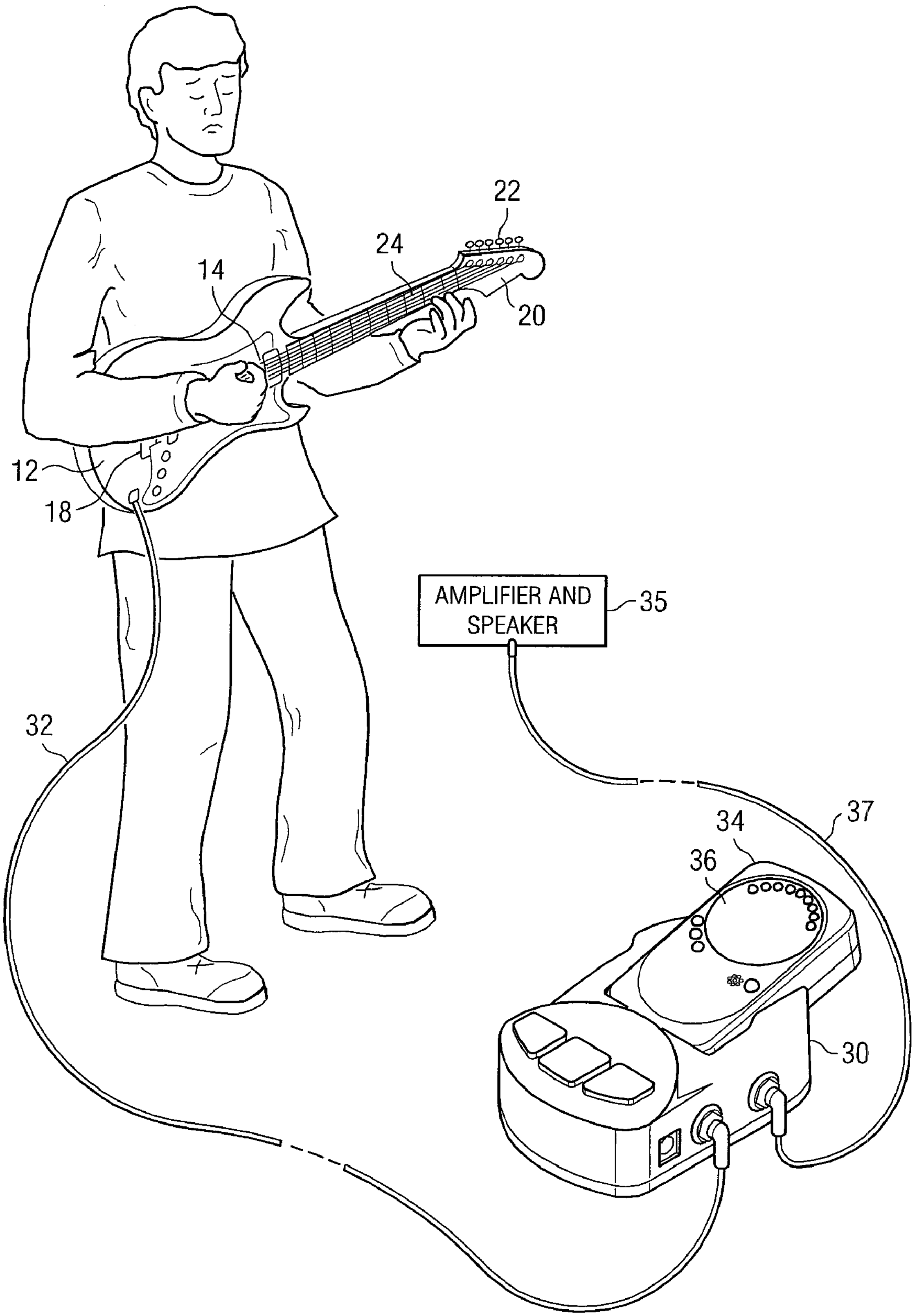
FIG. 1 illustrates a guitar connected to a modular foot-operated docking system.

Referring to FIG. 1, a musical instrument is shown as guitar 12. There are many types and configurations of guitars including electric, electric bass, and acoustic styles. Other types of musical string instruments include the mandolin, viola, and violin. Each type of musical instrument has a number of strings running across the frame of the instrument. The musical artist plays the instrument by displacing one or more of the tightly-strung strings from a neutral position and then releasing it, causing the string to vibrate as it returns to its neutral position. The string vibration emits different sounds or audio signals depending on a number of factors, including type of instrument, effective length of the string, and skill of the musician.

It is desirable to enhance or modify the audio signals from guitar 12 or any other musical instrument. Some examples of audio signal modification include adding effects, synthesizing audio signals, performing signal conversion, and filtering. The audio signal enhancement is typically performed in equipment external to the musical instrument. The present invention makes use of an electronic module which performs many of the signal processing functions for the musical instrument as well as the associated external equipment. The same electronic module is adapted for use with many different receiving devices and can be used in many operating modes, including hand-held operation, insertion into a docking station, insertion into the musical instrument itself, or insertion into other equipment used on conjunction with the musical instrument. The electronic module is programmable and can be transported from equipment to equipment to provide useful customized signal processing capability as well as share stored data. If the user creates a custom piece of accompanying music on his computer with the electronic module, the same music is available when the module is inserted into the amplifier and speaker system. One electronic module is transportable between systems and programmable for use with each receiving device.

First consider the case in which guitar 12 is connected to docking station or base unit 30. The audio signals from guitar 12 are routed to docking station 30 by way of cable 32. Docking station 30 is designed to rest on the floor and be operated by the artist's foot. Docking station 30 receives an electronic module 34 to provide electrical functions for guitar 12. The electronic module 34 easily slips into docking station 30 and makes a mechanical and electrical connection. The artist depresses one or more pushbuttons on the top surface of docking station 30 to activate features within electronic module 34. The artist can visually monitor a display area 36, e.g., via liquid crystal display (LCD) or light emitting diodes (LED), on the electronic module. Docking station 30 is further connected to amplifier and speaker system 35 by cable 37. The audio signals from guitar 12 are thus enhanced or modified by electronic module 34 prior to being routed to amplifier and speaker system 35. Some of the signal enhancements and functions include effects, synthesis, filtering, tuning, signal conversion, and electronic memory storage.

Figure 2A:
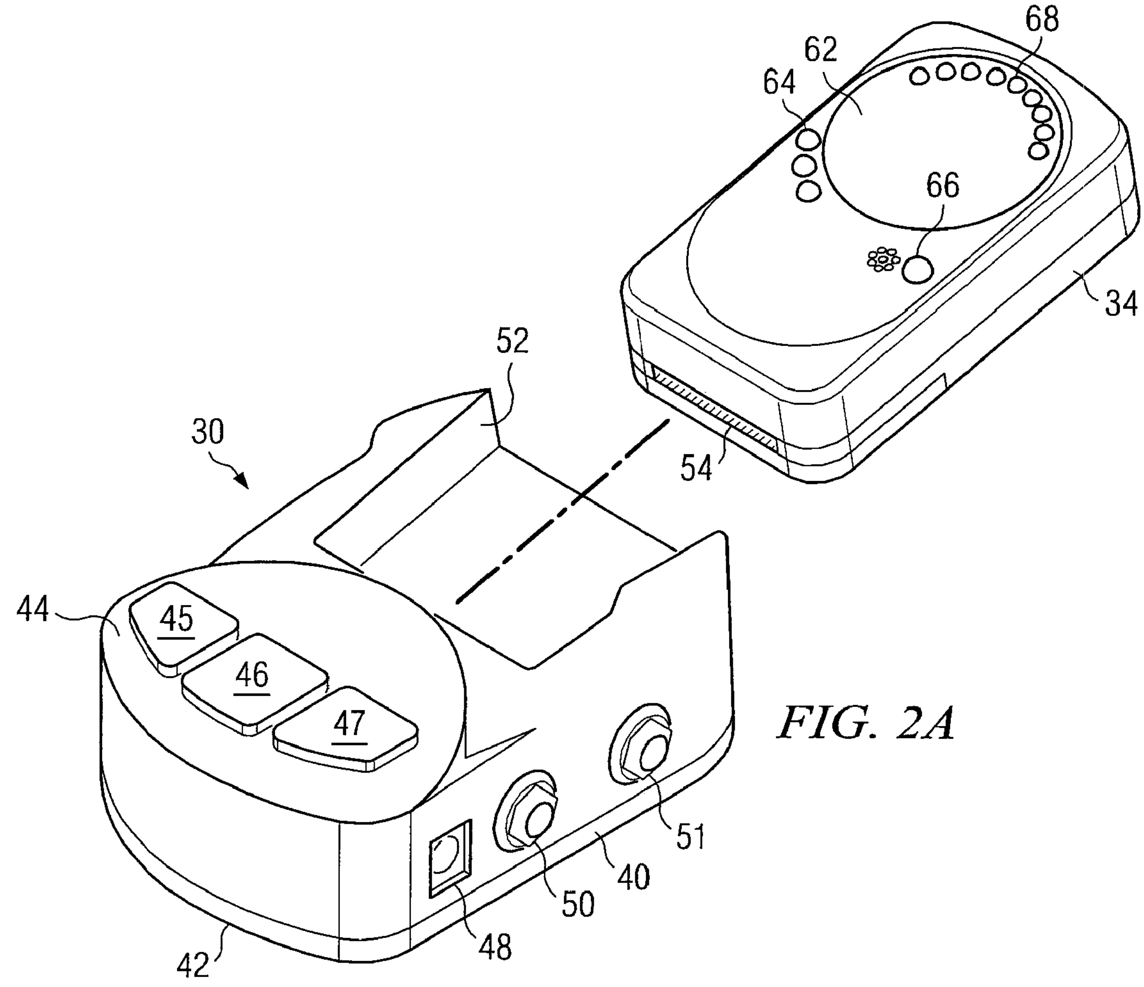
FIGS. 2A and 2B illustrate the docking station receiving an electronic module.

Further detail of docking station 30 is shown in FIG. 2A. Docking station 30 has a flat bottom portion 40 with non-slip surface 42 such as rubber or similar synthetic material. The non-slip surface 42 may have ridges or grooves for additional shear gripping strength. Docking station 30 has a beveled portion 44 with three pushbutton electrical switches 45, 46, and 47. Beveled portion 44 is angled to conveniently fit under the artist's shoe or foot, i.e., either the toe or ball portion of the shoe, with the heel resting on the ground. Pushbutton switches 45-47 are foot-operated and can be individually pressed or activated by applying pressure with the foot. The artist can separately or simultaneously press the left pushbutton, the middle pushbutton, and/or the right pushbutton. Connector 48 is a DC power jack. Connector 50 is a 0.25-inch jack for connecting cable 32 to guitar 12 to receive the audio signal from the instrument. Docking station 30 may include additional connectors like 51 for various input and output functions, e.g., output to amplifier and speaker system 35 via cable 37.

Docking station 30 further includes a slot or receptacle 52 for receiving a plug-in electronic module 34. Electronic module 34 slides into receptacle 52 and makes mechanical and electrical contact with docking station 30 with connector 54. Docking station 30 represents one type of receiving device for electronic module 34.

Figure 2B:
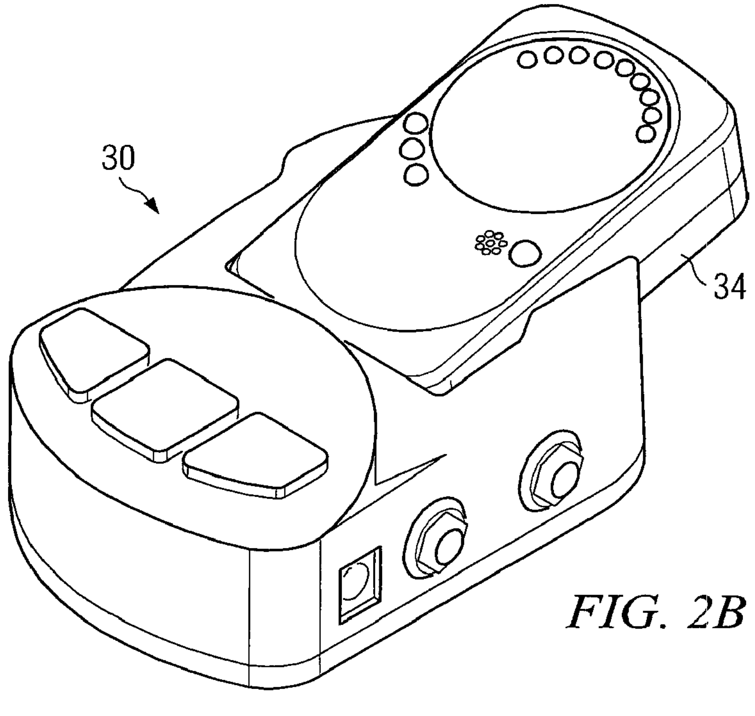

FIG. 2B illustrates electronic module 34 inserted into receptacle 52 of docking station 30. Electronic module 34 becomes an integral part of docking station 30 by nature of the mechanical and electrical connection. The electrical signal or function selected by pressing one of pushbuttons 45-47 is transmitted to electronic module 34. Electronic module 34 generally has a display area 62 and indicator LEDs 64 and 66. LED 64 may indicate one or more functions associated with electronic module 34. LED 66 is an electric power indicator. Display area 62 may have further indicator lights 68 for showing dynamic ranges and scaling.

Figure 3:
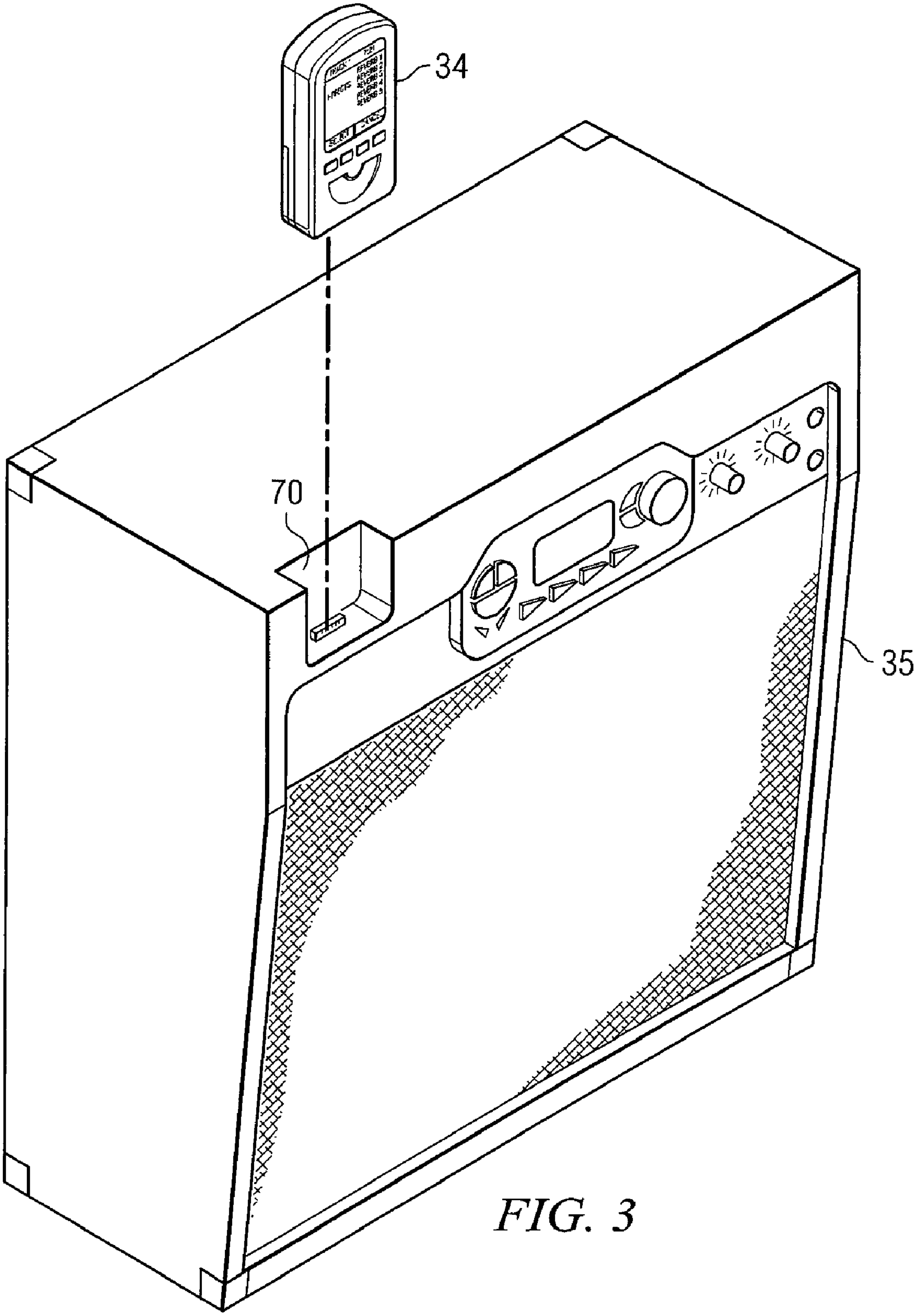
FIG. 3 illustrates the electronic module inserted into the amplifier and speaker system.

FIG. 3 illustrates electronic module 34 inserted directly into amplifier and speaker system 35. The electronic module makes mechanical and electrical connection into receptacle or slot 70 of amplifier and speaker system 35. The amplifier and speaker system represents another type of receiving device for electronic module 34. As described below, the electronic module is then programmed to control the operation and provide additional functions for the amplifier and speaker system.

Figure 4A:
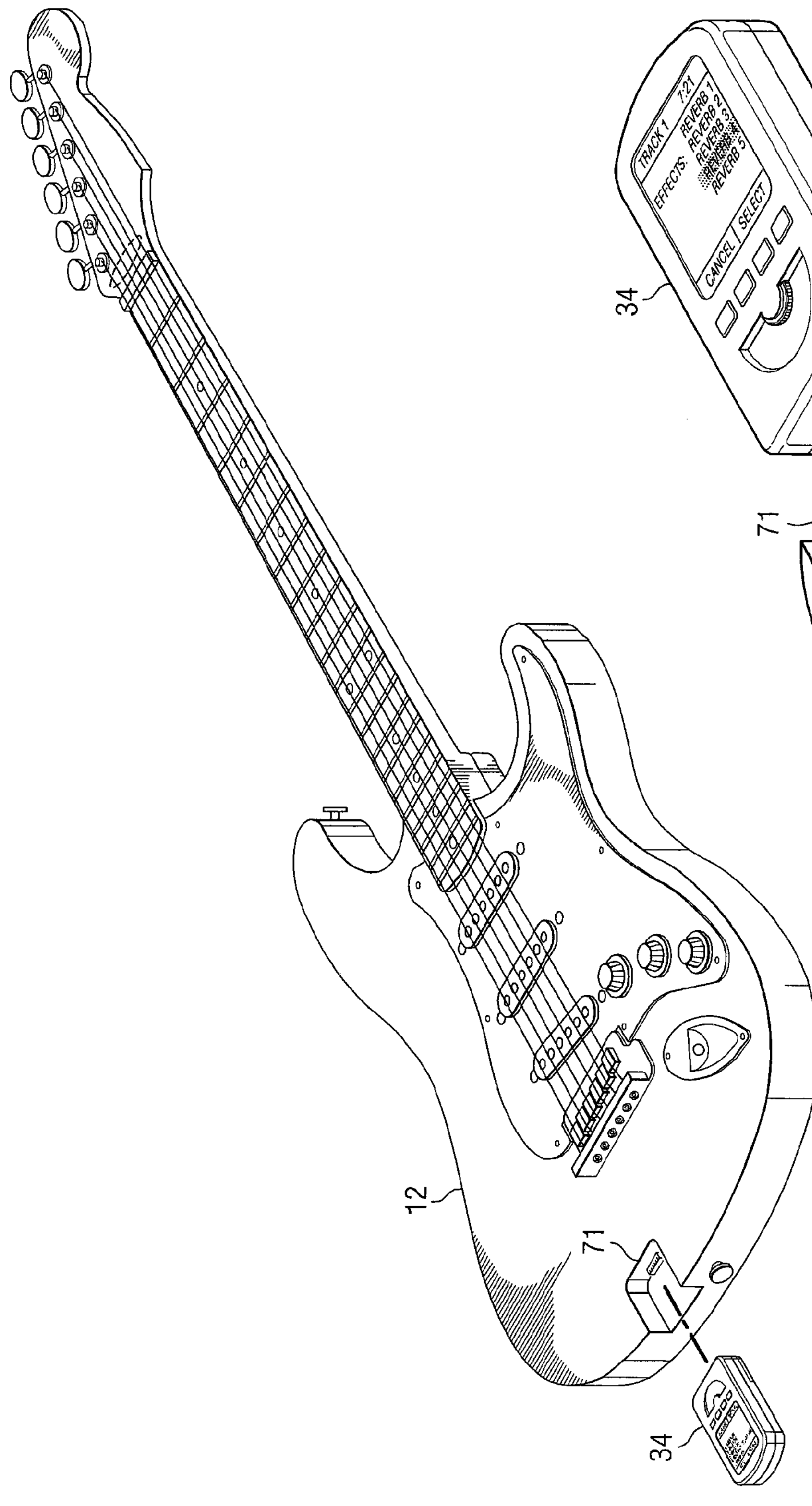
FIGS. 4*a*-4*b* illustrates the electronic module inserted into a guitar body.
Figure 4B:
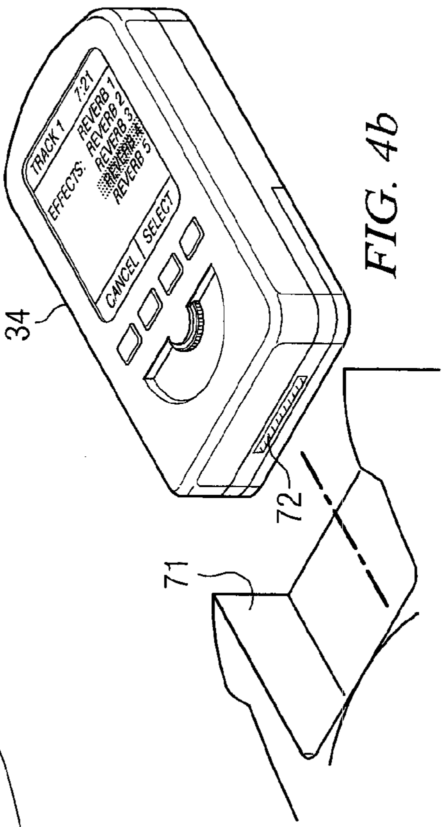

Alternatively, electronic module 34 can be inserted into receptacle or slot 71 to make mechanical and electrical connection with guitar 12, as shown in FIG. 4*a*. The guitar represents yet another type of receiving device for electronic module 34. The electronic module is programmed to control the operation and provide additional functions for guitar 12. FIG. 4*b* shows further detail of electronic module 34 connecting into slot 71. Electrical connector 72 mates with a corresponding electrical connector in slot 71.

Figure 5:
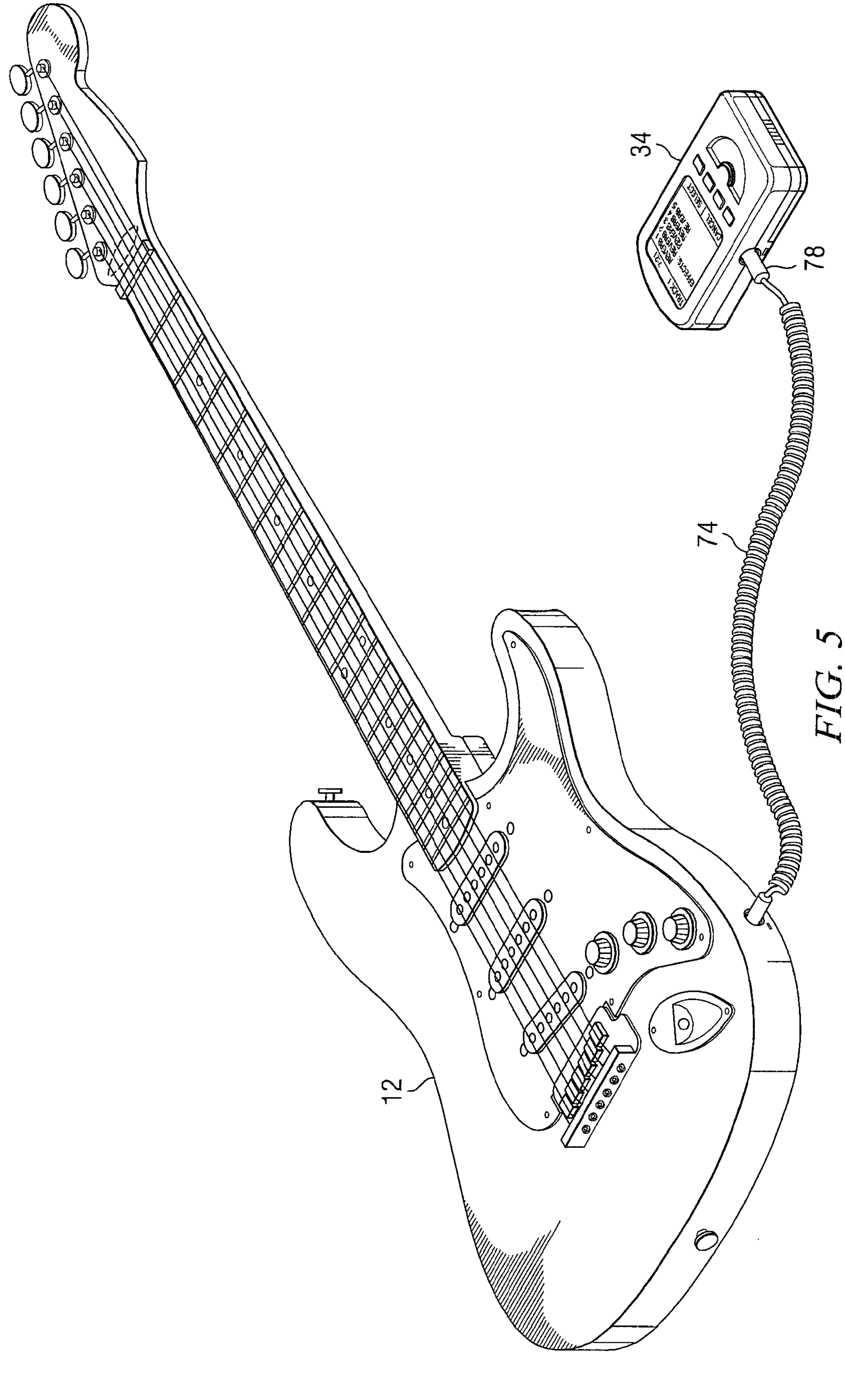
FIG. 5 illustrates the electronic module operated in standalone mode connected to the guitar.

FIG. 5 illustrates a hand-held option with electronic module 34 electrically connected to guitar 12 by way of cable 74, which plugs into jack 78 of the module. The electronic module is programmed to control the operation and provide additional functions for guitar 12, including sending and receiving analog and/or digital signals via cable 74.

As noted above, electronic module 34 is an all-in-one system which is programmable to provide full control over a variety of musical instruments and associated external equipment. Electronic module 34 has a common mechanical and electrical connectivity specification for each type of receiving device and as such can be readily inserted and removed from the equipment, docking station, or instrument, or used in a hand-held mode. The same electronic module can be programmed for use in several modes and is compatible with a number of receiving devices. As such, electronic module 34 is a versatile, multi-function, interchangeable, standalone system.

The form factor of standalone module 34 is designed for portable use and ease of transport and interchanged between receiving devices. In one embodiment, electronic module 34 is 5 inches in length by 2.5 inches in width by 1 inch thick. Electronic module 34 can slide into a protective sheath which encases the module. Electronic module 34 can be adapted to be worn on clothing.

Figure 6:
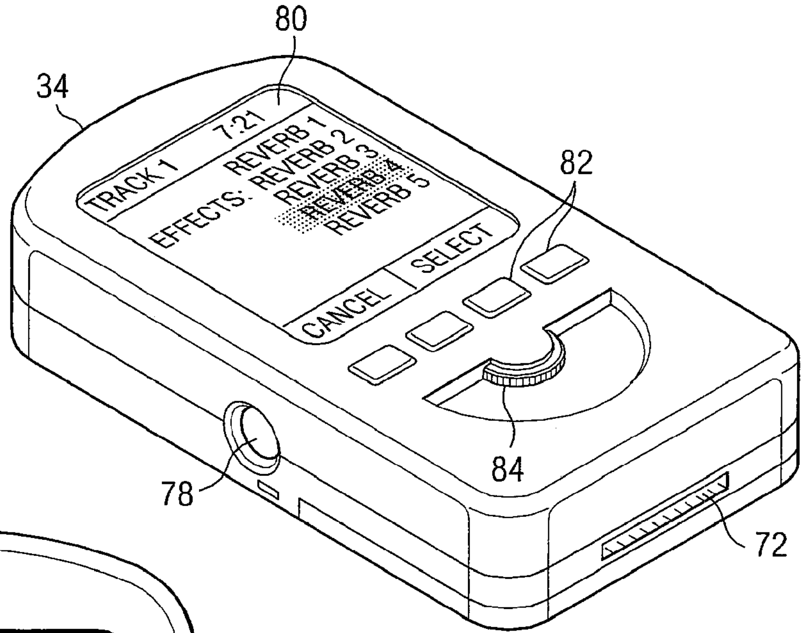
FIG. 6 illustrates the electronic module with configurable LCD screen.

FIG. 6 shows electronic module 34 with connector 78 as an audio input or output for connecting to guitar 12 or other musical instruments. In addition, other connectors can be incorporated into electronic module 34, such as a headphone jack for connecting to external headphones. Electronic module 34 further includes a connector 72 to allow the module to interface with docking station 30 or to interface with additional devices such as amplifier and speaker system 35, guitar 12, or a personal computer. Connector 72, like connector 78, can incorporate and be compatible with any known interface specification known in the art, such as a universal serial bus (USB).

In FIG. 6, electronic module 34 has an LCD display 80. LCD display 80 can be configured by software to display many different menus, information formats, and operating information to a user. Control buttons 82 can be programmed to perform a variety of functions, depending on a control function which is currently displayed by display 80. The programming of the control buttons 82 and display 80 is based on the desired function and which receiving device the electronic module is plugged into at the moment. In one embodiment, control buttons 82 can control functions such as volume, tone, frequency response, equalization, and other sound control functions for amplifier and speaker system 35. Control buttons 82 can further include functional mode buttons to select a particular mode, or selection buttons to choose a particular selection which is currently displayed by display 80. The control buttons 82 are elastomeric rubber pads which are intended to provide soft touch and long life. Alternatively, the buttons may be hard plastic with tactic feedback micro-electronic switches. Data wheel 84 can provide additional user control functionality as will be described.

Electronic module 34 is fully programmable, and menu driven, using software to configure and control the sound reproduction features and additional functionality associated with each type of receiving device described herein. For example, the same electronic module 34 can be programmed to operate with amplifier and speaker system 35, and then removed and programmed to operate in hand-held mode with guitar 12, and then removed and programmed to operate in docking station 30, and so on. Labels for control buttons 82 can be incorporated, through software, into the graphical user interface (GUI) and displayed on display 80 customized for each type of receiving device. Display 80 can include touch screen technology for receiving user commands. The combination of functional mode buttons, selection buttons, or touch screen-enabled control buttons provide control over a variety of operational modes, access to menus for selecting and editing functions, and overall configuration of electronic module 34. The front panel of module 34 can also include LEDs (not shown) as indicators for a variety of functions, such as sync/tap, tempo, save, record, power, or other functions.

Display 80 changes with the user selections to provide many different configuration and operational menus and options, depending on the desired function and receiving device. The operating modes may include startup and self-test, play, edit, utility, save, and tuner. In one operating mode, display 80 may show the playing mode of the audio sound system. In another operating mode, display 80 may display the MIDI data transfer in process. In another operating mode, display 80 may display default setting and presets. In yet another operating mode, display 80 may display a tuning meter.

Figure 7:
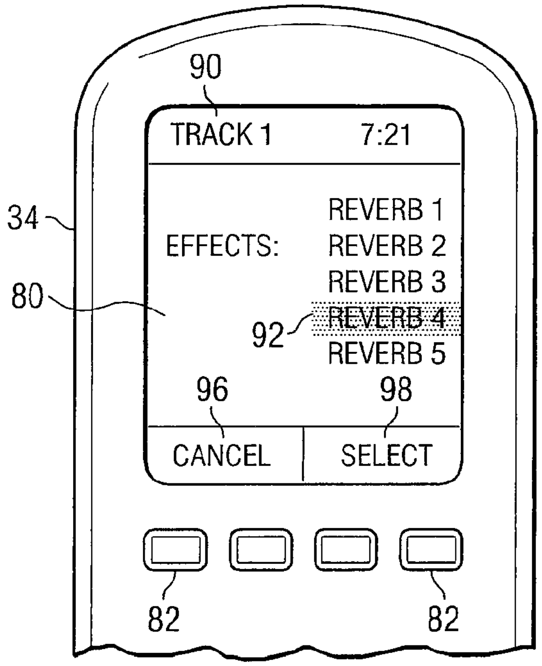
FIG. 7 illustrates a first GUI screen of the electronic module.

FIG. 7 illustrates LCD display 80 in an example operating mode. Display 80 can display information such as bar meters, alphanumeric data for accompanying instruments, graphic information for frequency response, and numbers for volume levels. The bottom part of display 80 may show arrows pointing to selection keys 82. The selection keys can be programmed to perform different functions which are dynamically assigned to the selection keys and identified on the LCD display. The software executing within module 34 controls display 80 to display many different menu and submenu levels in a hierarchical manner and programmable features which are selected with the functional mode buttons, selection buttons, and data wheel 84, each depending on the desired functions with the associated receiving device.

The functional mode buttons and selection buttons 82 may be fixed or programmed as select keys, sample stop key, sample play key, sample record key, utility key, tuner key, sync/tap key, effects key, amp key, tempo key, drums key, auxiliary key, save key, and exit key. An optional data wheel 84 rotates in both directions to change values and options within the various menus. For example, data wheel 84 can be rotated right or left to increase or decrease values within any particular settings.

In one embodiment, e.g., where electronic module 34 is used with docking station 30 or in hand-held mode, functional mode buttons 82 are assigned fixed features such as utility, tuner, and other global functions. The utility key allows the user to change settings to MIDI, playback, and recorded phrases and samples. The utility key also allows the user to perform system management functions like restoring factory presets, downloading new MIDI files and operating systems, and uploading and downloading presets. The tuner key places the electronic module 34 into a fully chromatic tuner mode and changes the display to show a tuning meter. The tuning meter shifts left and right as the user manually tunes each note of the musical instrument. The instrument is in-tune for the corresponding note when the tuning meter is centered or balanced.

Consider an example where the user wants to preset the equalizer settings. The user selects the utility key to display the utility options on display 80. The data wheel 84 rotates between the various options. In this mode, the selection keys 82 may be programmed for page up, page down, edit, and save. The user scrolls to the equalizer settings option and presses the edit key. The user is presented with the different frequency bands or ranges. Again, the user rotates data wheel 84 to change the equalizer values of each frequency band within the equalizer submenu. The save key allows the user to save the new settings.

The LCD display 80 can also be used to configure and execute any one or combination of the following functions: digital guitar effects, equalization, filters, phrase training, phrase recording, phrase sampler, chromatic tuner, play loops, variable speed playback, sound selection, style selection, and restore factory settings. In addition, functions such as equalization, echo, reverb, chorus, tremolo, vibrato, and panning effects can be configured and executed. A digital signal processor (DSP) integrated into module 34 can be configured to provide features such as amplifier modeling, guitar modeling, cabinet modeling, or cord modeling as will be further described. Additionally, the user can download MIDI files and presets and store such data in internal memory in module 34 for future use by way of display 80.

Accordingly, the front panel control of display 80 provides a full-feature, multi-functional, integrated guitar entertainment center, fully compatible with many different receiving devices. The electronic module is readily transportable between different receiving devices and then programmable to fully operate the current receiving device. In one type of receiving device, e.g., amplifier and speaker system 35, the front panel provides controls for synthesizing a myriad of accompanying instruments such as electric guitar, violin, horns, brass, drums, wind instruments, string instruments, electric keyboard, audio microphone, percussions, or other instrument generating electric signals representative of sound content. The internal synthesizer of module 34 uses DSP technology to produce multiple sounds simultaneously. Electronic module 34 can be coupled to amplifier and speaker system 35 to provide an audio sound system including a virtual band to support guitar 12 for the enjoyment of listeners. Electronic module 34 is ideal for solo practice, private settings, and entertainment for small gatherings. The relative thin form factor and uniform aspect ratio gives module 34 features such as light weight, stability, portability, and transportability.

In FIG. 7, the electronic module 34 has been configured to play a background track 1, which appears in window segment 90. Segment 90 displays the track number ("Track 1") and/or other relevant information, such as elapsed time. Such display information can be changed by a user by pressing a pre-programmed selection button 82, or by selecting a particular menu option on the screen 80 and operating a touch screen-enabled key.

Window segment 92 displays a menu selection of reverberation effects, which are listed in numerical order as shown. In the depicted example, the user has highlighted the "reverb 4" option. The reverberation effects can be intended to change the effect of the background track. Alternatively, the reverberation can be modifying a particular audio input signal received from a musical instrument such as a guitar, in effect modifying the sound of the guitar strings to incorporate the reverberation effect selected.

Windows 96 and 98 depict programmed touch screen-enabled buttons "cancel" and "select", respectively. Select button 98 acts to select the reverberation effect 92. The cancel button 96 returns the user to a previous menu screen 80 with accompanying window screens. For example, the user may be returned to a more generic screen which reflects additional sound effect choices such as equalization, echo, reverb, chorus, tremolo, vibrato, and panning effects.

Figure 8:
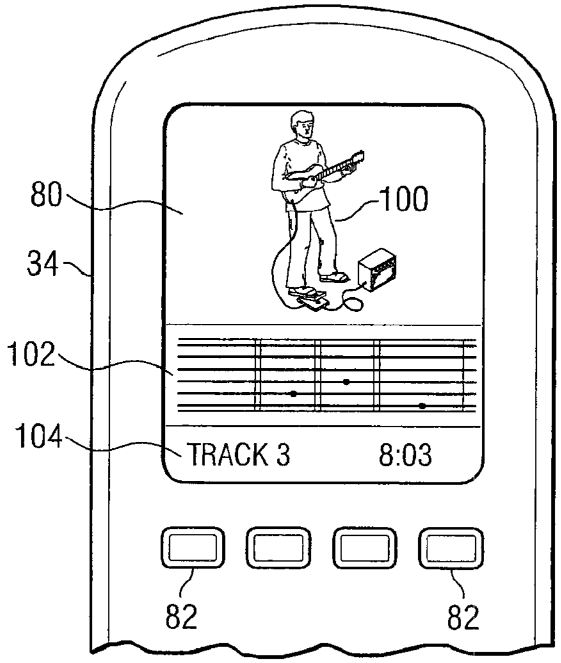
FIG. 8 illustrates a second GUI screen of the electronic module.

FIG. 8 illustrates an additional example GUI configuration of electronic module 34 and LCD display 80. Window segment 100 shows a video screen of a professional instructor playing the guitar. Window 102 shows the relevant guitar tab which is displayed to the user. Finally, a background track is displayed with an accompanying elapsed time in window segment 104. This configuration allows a user to import instruction and tutorial information for the guitar from a remote computer or another source, download the information to electronic module 34, and then couple a guitar to the electronic module 34 personalized instruction. For example, the background track may be a particular musical genre that the user is interested in playing. An instructor demonstrates the appropriate hand and finger positions while the relevant guitar tab is displayed. Display 80 can be adapted for similar configurations to suit a particular application.

All of the above features can be used with electronic module 34 inserted into a receptacle of a receiving device or connected by cable to a receiving device in hand-held mode.

Figure 9:
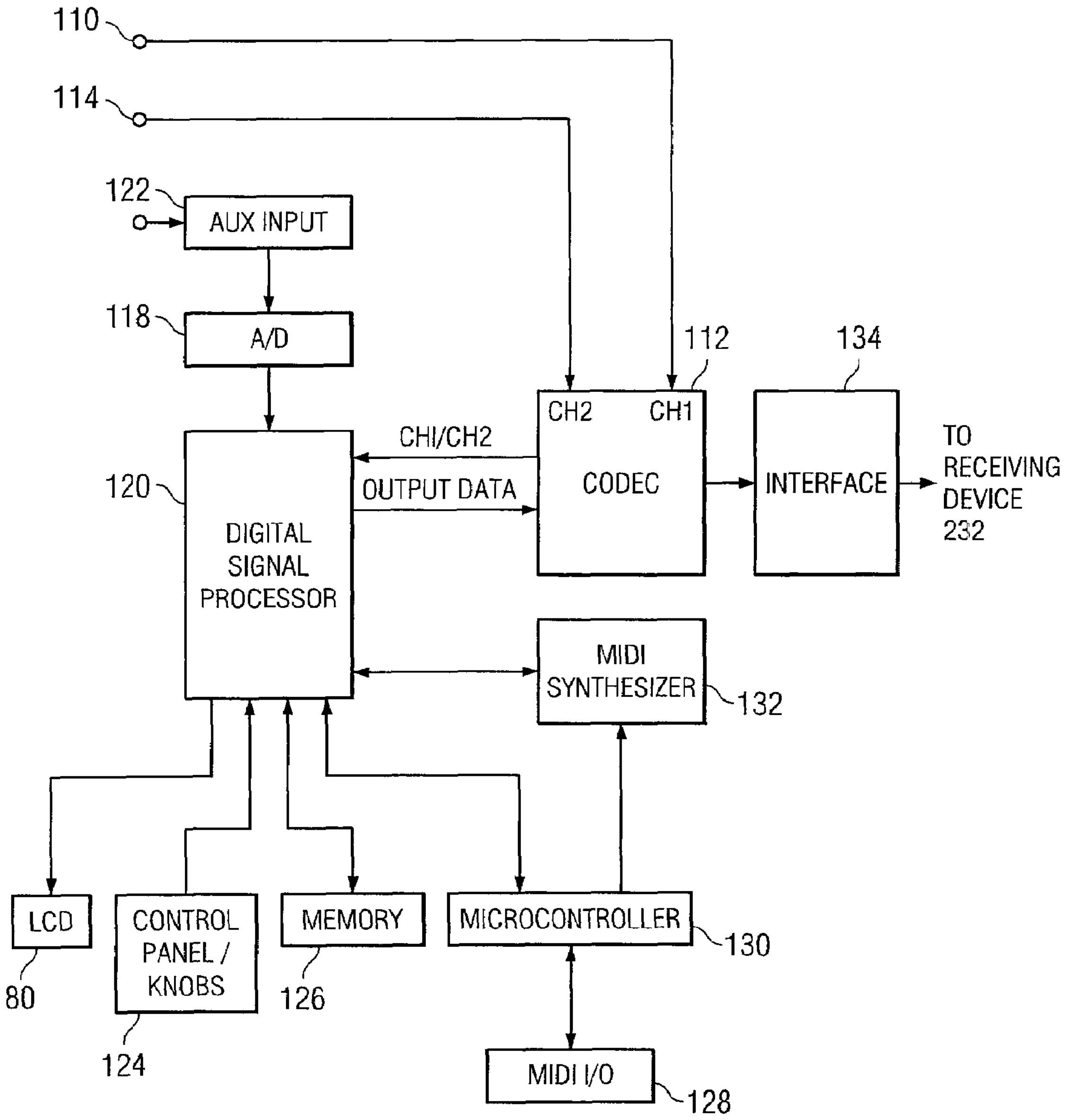
FIG. 9 illustrates an electrical block diagram of the electronic module.

The electronic module 34 provides a number of signal processing capabilities and functions useful with guitar 12, as well as associated external equipment, as described herein. A block diagram of electronic module 34 is shown in FIG. 9. The DSP-based block diagram allows electronic module 34 to perform many functions such as audio synthesis, signal conditioning (filtering), signal distribution, signal conversion (analog to digital or digital to analog), and electronic data storage. For example, electronic module 34 has an effects processor which introduces distortion into the audio signal. The effects processor can also add chorus, reverb, and delay effects into the audio signal. Display 80 shows the present state of the effects processor.

Audio input jack 110 is coupled to channel (CH) 1 of coder/decoder (codec) block 112. Audio input jack 114 is coupled to channel (CH) 2 of codec block 112. Alternatively, the audio input jacks may be routed through an analog to digital (A/D) converter to an input of DSP 120. Analog signals received at aux input 122 are converted to digital signals by A/D converter 118 and sent to DSP 120. The digitized audio signals from audio input jack 110 and 114 are routed by way of CH1/CH2 link to DSP 120. Codec block 112 includes A/D converters and digital to analog (D/A) converters for the necessary conversions.

DSP 120 can execute the software to perform the various configuration and signal processing functions of electronic module 34. DSP 120 combines and mixes the digital audio signals from the various inputs using signal processing techniques. The software determines the menu options on LCD display 80 and programs the functions imparted to the control panel selection keys 82. DSP 120 further drives LCD display 80 on the front panel. Control panel/knobs 124 corresponds to the various selection and control buttons and wheels on the front panel of electronic module 34 to provide the user interface to the module.

DSP 120 can be a generic name for any number of related processing devices which are coupled to and/or integrated into DSP 120. These devices can include effects processors, signal conditioners, signal distributors, and/or signal converters which perform a variety of signal processing activities on incoming or outgoing, stored or converted signals.

The processing devices related or integrated into DSP 120 can perform a host of signal processing tasks. An effects processor can perform such features as equalization, echo, reverberation, chorus, tremolo, vibrato, and/or panning effects. The effects can be implemented on audio signals emanating from the musical instrument or implemented to render ancillary signals such as background tracks, MIDI files and the like in a particular fashion.

DSP 120 accesses memory 126 to store software, settings, MIDI files, and sampled audio. Memory 126 may be implemented as one or more storage devices such as random access memory (RAM), read only memory (ROM), electrically programmable memory (EPROM), removable memory devices, and magnetic storage, e.g., hard disk. The memory can store computer-readable program code instructions which operates DSP 120.

Electronic module 34 sends and receives MIDI data via MIDI I/O jacks 128 as can be provided on the front panel. The MIDI can be received from a personal computer (PC), keyboard, or any other device which transmits a MIDI data stream. MIDI communication protocol provides a data stream according to industry standards which allows for synthesis of virtually any sound. MIDI data is used with electronic devices such as DSP 120 or other synthesizer to generate musical instruments such as drums, guitar, horns, keyboard, tambourines, organs, wind instruments, and string instruments. MIDI data can also synthesize vocals and natural sounds.

MIDI I/O jacks 128 send and receive data through general purpose microcontroller 130, which routes MIDI data to DSP 120 or to MIDI synthesizer 132. Microcontroller 130 also receives MIDI data from DSP 120 for external access and storage. Microcontroller 130 controls the overall flow of MIDI data. The MIDI data may be sent to DSP 120 for further processing or storage in memory 126. DSP 120 can also route the MIDI data from internal sources, e.g., memory 126, to MIDI synthesizer 132.

DSP 120, in conjunction with related processing devices such as microcontroller 130 and/or MIDI synthesizer 132, can provide a variety of modeling functions to a user through the use of electronic module 34. The modeling functions can be selectable by a user in the display 80 and customizable through software executing on electronic module 34. DSP 120 can implement amplifier modeling, which causes an incoming audio stream generated by a user playing a musical instrument such as a guitar to be modified, so that the outgoing audio stream when heard resembles that sound which is produced by a specific amplifier. DSP 120 can implement certain algorithms to effect such modification on the audio signal. Amplifier modeling can, in one example, reflect an amplifier having solid-state components. In another example, amplifier modeling can reflect an amplifier which includes older vacuum tube technology which many users find produces a “warmer” tone.

Similarly, DSP 120 and related processors can be made to model the varying tone produced by various analog cords which normally connect a guitar to an amplifier. Depending on construction, the cords can exhibit a certain amount of capacitance and impedance which is reflected in the overall tone transferred from the guitar to the amplifier. A programmable algorithm can be implemented and executed by DSP 120 to model the physical characteristics of the cord. Such modeling can be referred to as “cord modeling”. The varying physical characteristics of a musical instrument itself, such as a guitar, or the varying physical characteristics of an amplifier cabinet can also be emulated, using so-called “cabinet modeling” or “instrument modeling” using similar techniques.

MIDI synthesizer 132 processes the MIDI data to generate the programmed sounds. In one embodiment, MIDI synthesizer 132 can be implemented as Atmel Part No. ATSAM3308 MIDI-Synthesizer. The MIDI data may be used to synthesize virtually any tune, melody, song, or individual instrumental number. The MIDI data can be used to synthesize any combination of drums, guitar, horns, keyboard, tambourines, organs, wind instruments, and string instruments. The synthesized audio from MIDI synthesizer 132 is routed to DSP 120, which then combines the synthesized audio with the digitized audio signals received via CH1/CH2, or A/D converter 118, and outputs the composite OUTPUT DATA signal to codec block 112.

The analog output of codec block 112 can be routed through an interface device 134 where it is received by a receiving device, such as an external power amplifier, external speaker, or guitar. An amplified analog output can also be available to a headphone jack integrated into electronic module 34.

Figure 10A:
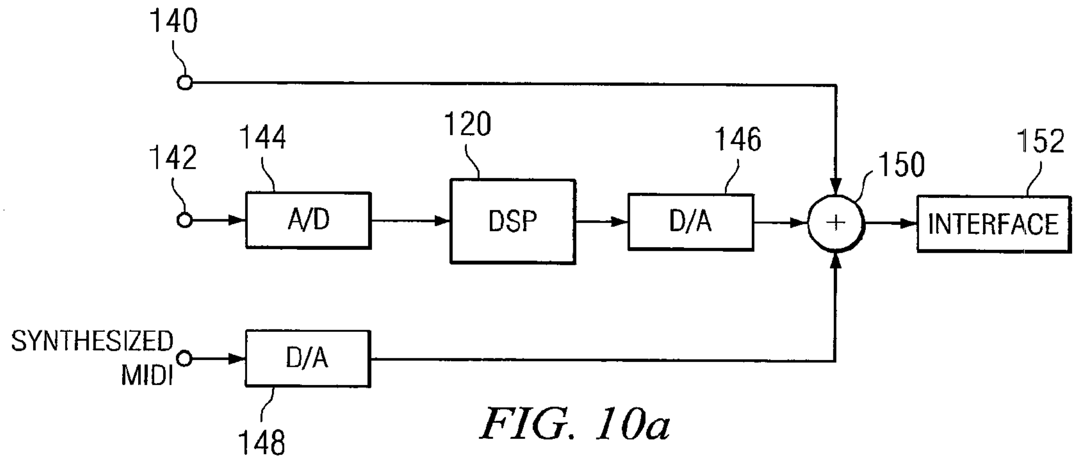
FIGS. 10*a*-10*c* illustrate representative configurations of the electrical block diagram of FIG. 9.

FIG. 10*a* illustrates a first representative functional configuration of block diagram of FIG. 9. Analog audio signals are received at terminals 140 and 142. The audio signal on terminal 142 is converted to a digital audio signal by A/D converter 144, processed in DSP 120, and converted back to analog audio signal by D/A converter 146. The synthesized MIDI signals are converted to analog audio signals by D/A 148. The analog signals are summed in audio summing junction 150 and routed to external interface 152 for amplification or other external processing.

Figure 10B:
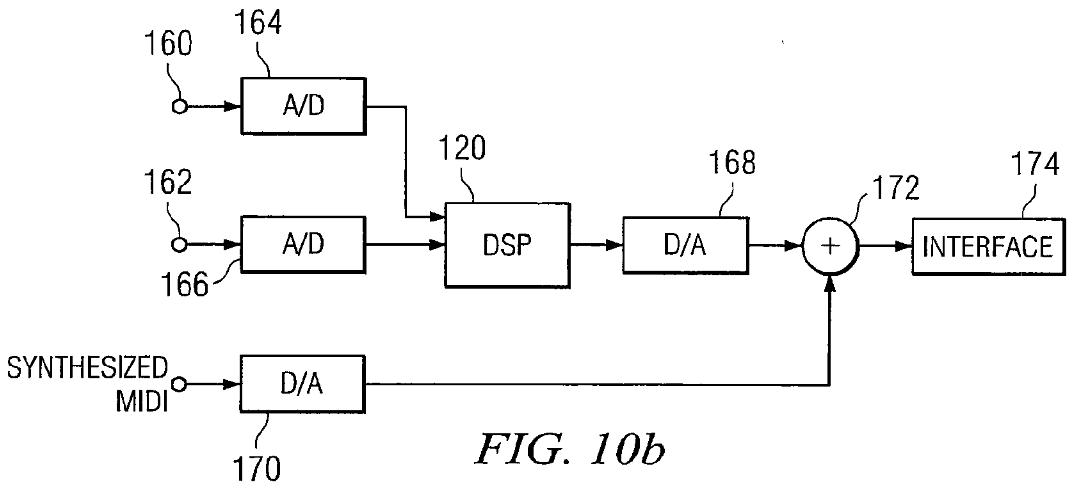

FIG. 10*b* illustrates a second representative functional configuration of electrical block diagram of FIG. 9. Analog audio signals are received at terminals 160 and 162. The audio signals are converted to digital audio signals by A/D converters 164 and 166, processed in DSP 120, and converted back to an analog audio signal by D/A converter 168. The synthesized MIDI signals are converted to analog audio signals by D/A 170. The analog signals are summed in audio summing junction 172 and routed to interface 174.

Figure 10C:
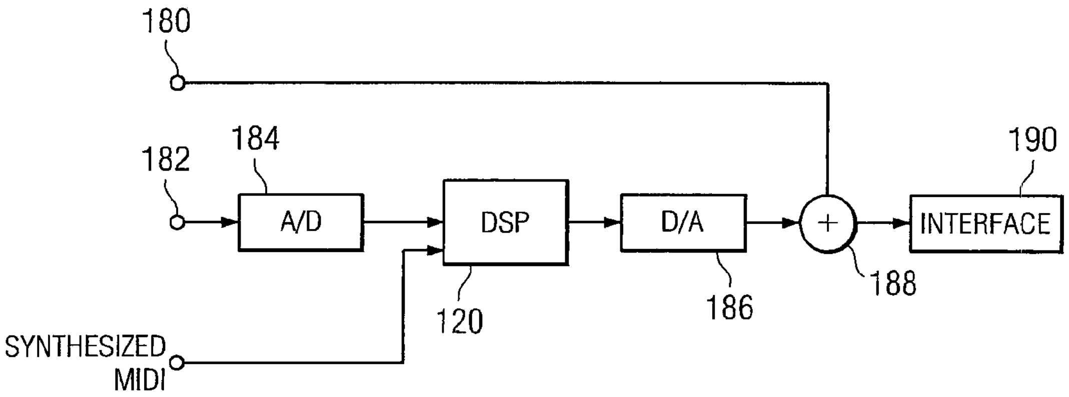

FIG. 10*c* illustrates a third representative functional configuration of electrical block diagram of FIG. 9. Analog audio signals are received at terminals 180 and 182. The audio signal on terminal 182 is converted to a digital audio signal by A/D converter 184 and routed to DSP 120. The synthesized MIDI signals in digital form are also sent in DSP 120. The DSP-processed signals are converted back to an analog audio signal by D/A converter 186. The analog signals are summed in summing junction 188 and routed to interface 190.

Figure 11:
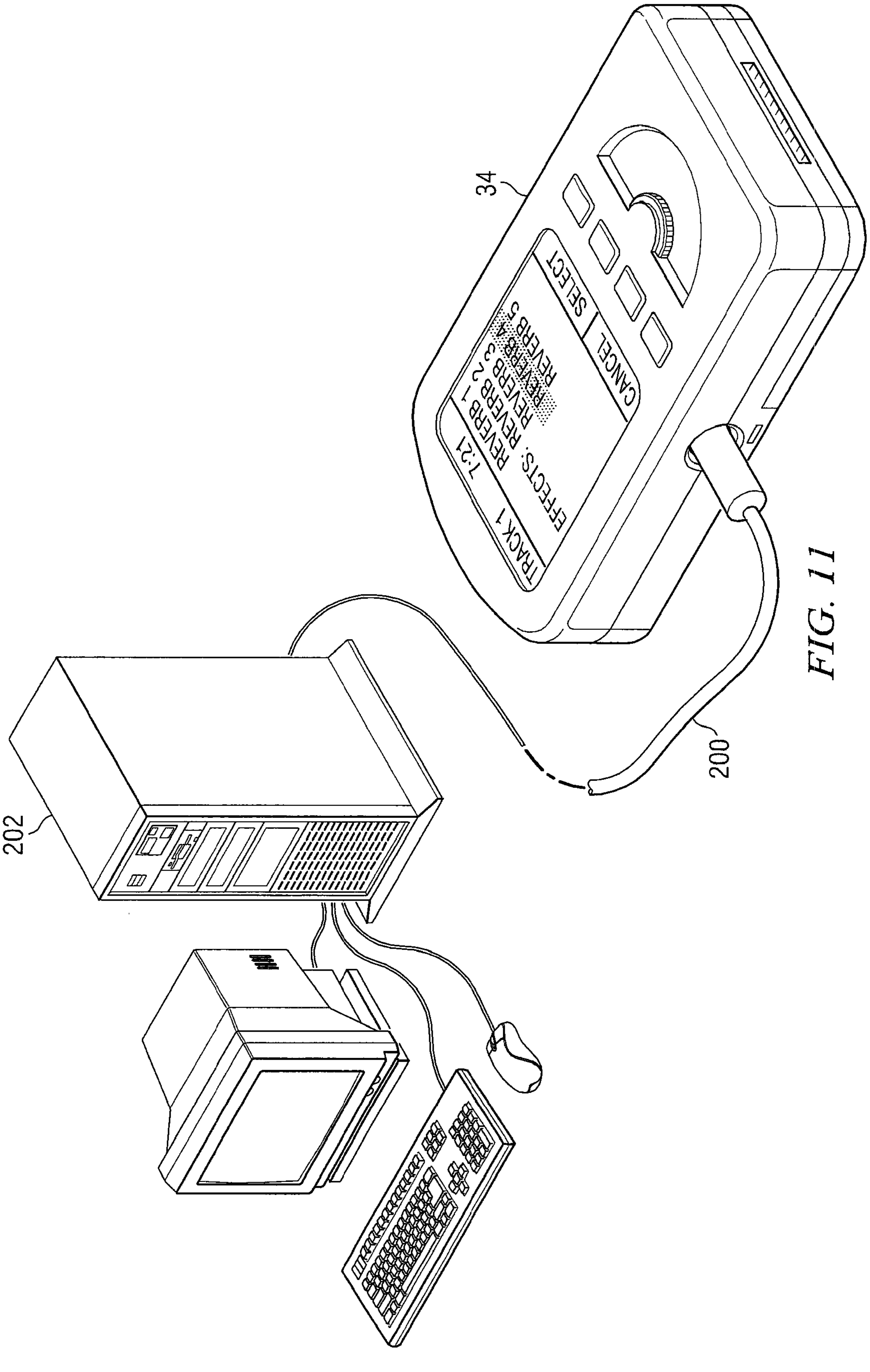
FIG. 11 illustrates the electronic module electrically connected to a computer.

Turning to FIG. 11, an additional configuration is shown illustrating electronic module 34 electrically coupled via cable 200 to computer 202. In one embodiment, the interface between computer 202 and electronic module 34 is a USB connection with associated interface device to transfer digital information to and from the module. In another embodiment, electronic module 34 can use a wireless protocol such as 802.11a,b,g or a similar medium to wirelessly communicate between computer 202. For instance, computer 202 can include program instructions to perform a specific functionality, such as a modeling function which will be further described. The modeling instructions may have been obtained from a remote server over the world-wide-web (WWW) and then transferred to electronic module 34.

Figure 12:
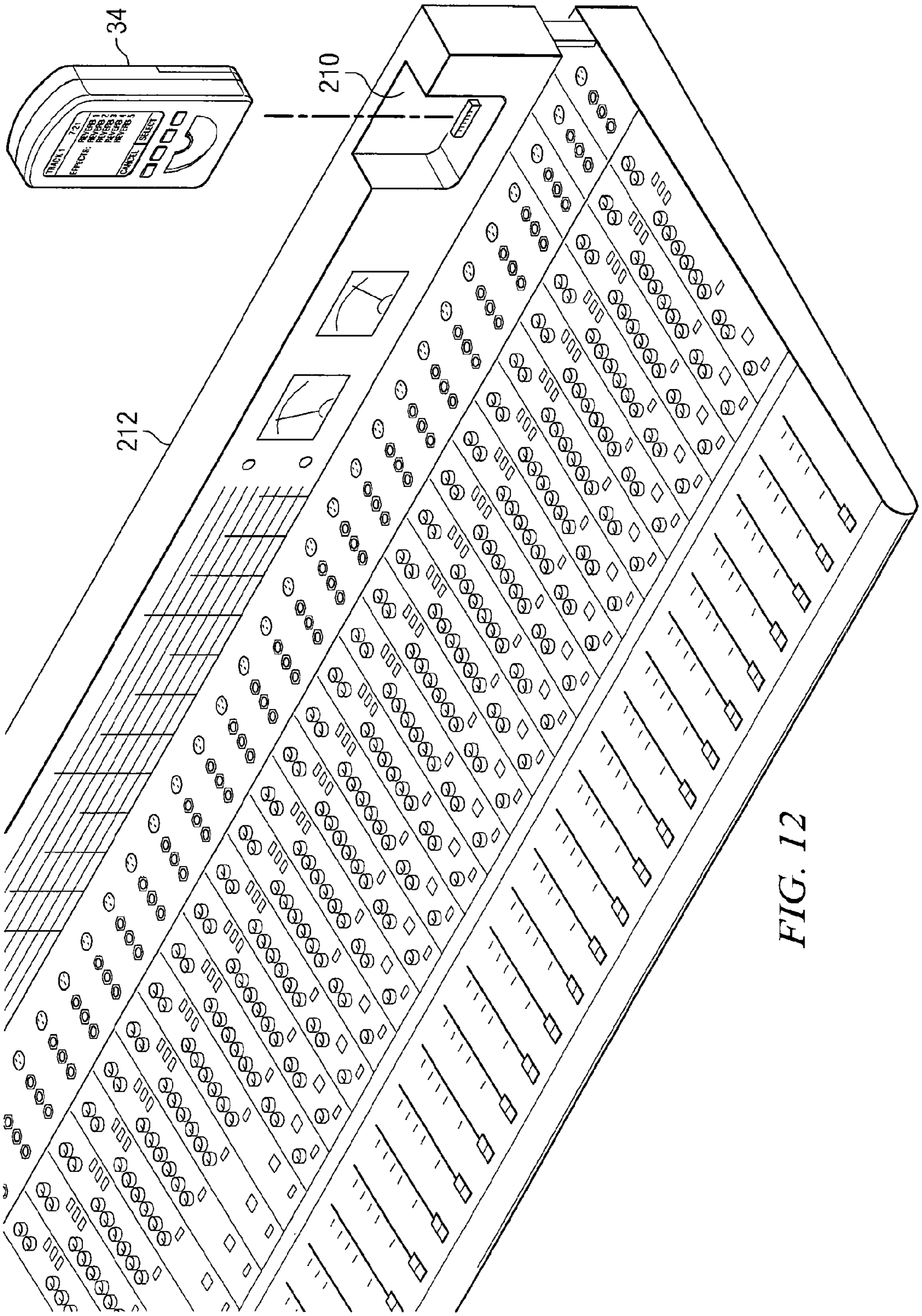
FIG. 12 illustrates the electronic module inserted into a mixing board.

FIG. 12 illustrates an additional configuration with electronic module 34 inserted into receiving port 210 of mixing board 212. Mixing board 212 can include commonly-known professional mixing equipment with controls over multiple channels. One implementation can envision a recording artist such as a vocalist bringing digital information to a performance which is stored in the memory of electronic module 34. The digital information can include signal processing instructions for a DSP to render audio information which is picked up by a microphone in a certain way, such as program instructions to model a certain reverberation or a similar effect. The vocalist can insert electronic module 34 into mixing board 212 in advance of the performance to transfer the appropriate settings to the mixing board.

Electronic module 34 can operate as a portable, fully integrated, multi-functional guitar entertainment center. The user can connect a musical instrument, such as an electric guitar or keyboard, and play music in many situations. Electronic module 34 can be programmed by the user through control panel 80 to generate virtually any other audio sound to accompany the user's instrument.

Electronic module 34 allows the user to operate as a one-man band. The MIDI data files for the accompanying instruments, e.g., drums, bass guitar, keyboard, are routed from an external source such as a PC through microcontroller 130 and DSP 120 and stored in memory 126. Upon command, DSP 120 retrieves the MIDI files and sends the data stream to MIDI synthesizer 132 which generates the desired accompaniments. Alternatively, the MIDI files can be provided from an internal source, e.g., memory 126. DSP 120 combines the user's instrument with the synthesized audio. The composite audio can be output through interface device 134 to an external amplifier or an external processing device. The user plays his/her own instrument live while electronic module 34 synthesizes all other instruments for a complete listening experience.

Electronic module 34 also functions as an equalizer, fully chromatic tuner, phrase sampler, phrase trainer, and equalizer in order to configure and execute play loops, MIDI files, variable speed playback, sample recording, sound selection, and style selection. The user can change speed and/or pitch of the MIDI files to learn to play certain difficult passages. Electronic module 34 provides play loops, external loops, on-board effects, and sound presets. Electronic module 34 may also have a vocal input jack for voice.

To perform background track playback and similar tasks, electronic module 34 can make use of a playback device incorporated into the module. For example, microcontroller 130 can work in conjunction with DSP 120 and memory 126 to stream digital audio files such as MIDI files previously described or files in related encoded formats, such as MP3 or MP4 which are combinable with user generated audio signals from a musical instrument. Similarly, background vocals can be played while a user plays a coupled instrument. The background tracks or background vocals can be retrieved from a storage device, i.e., memory 126 integrated into electronic module 34, and mixed with a live audio signal (i.e., inputs 110, 114, or 122) which is received in the electronic module from the musical instrument.

Electronic module 34 further operates as a tuner for adjusting the string tension of guitar 12. The electronic module can be used to tune both acoustic and electric guitars. The electronic module can be used with docking station 30 or in hand-held mode.

Returning to FIG. 1, strings 14 are routed from bridge 18 across the body or soundboard to head stock assembly 20. Guitar 12 may have five or six strings which are tightly strung between bridge 18 and head stock assembly 20. One end of each guitar string 14 is firmly attached or held to bridge 18. The other ends of strings 14 are attached to respective machine heads 22 on head stock assembly 20. Machine heads 22 are geared and can rotate or turn to increase or decrease the tension on strings 14.

The string tension is very important to the performance of the guitar. Guitar 12 is designed such that each string 14 resonates at a specific frequency. Given the resonant frequency of each string, the guitar player presses his or her fingertips of the off-hand on different locations of strings 14 on fret board 24 to produce different musical notes. If the string tension is not properly adjusted, then the base resonant frequency of the string is off and the note played will not sound right. The guitar is then considered out-of-tune and will not play as intended or designed.

For a given type of string, the string tension determines, to a significant degree, the resonant frequency of that string. Machine heads 22 are a primary string tension adjustment available to the artist or technician. Turning machine head 22 in one direction, e.g., clockwise, increases the string tension; turning machine head 22 in the other direction, e.g., counter-clockwise, reduces the string tension. The correct string tension is a fundamental precursor and requirement to maintaining guitar 12 in its properly tuned state or condition.

Guitar strings 14 can lose their correct tension in normal play and even more readily become out-of-tune when the instrument is played in an aggressive manner. The artist may find guitar 12 loses optimal string tension over the course of a playing session or performance and even between and during individual musical pieces. The artist typically does not have the time or opportunity to have the guitar professionally re-tuned in such settings. The artist may make use of portable tuners, or simply make best efforts to re-adjust the string tension, often by ear or feel alone. The artist turns machine heads 22 until the instrument sounds or feels about right, and awaits the next time that the instrument is in the repair shop or technician's bench for a thorough and proper re-tune.

Figure 13:
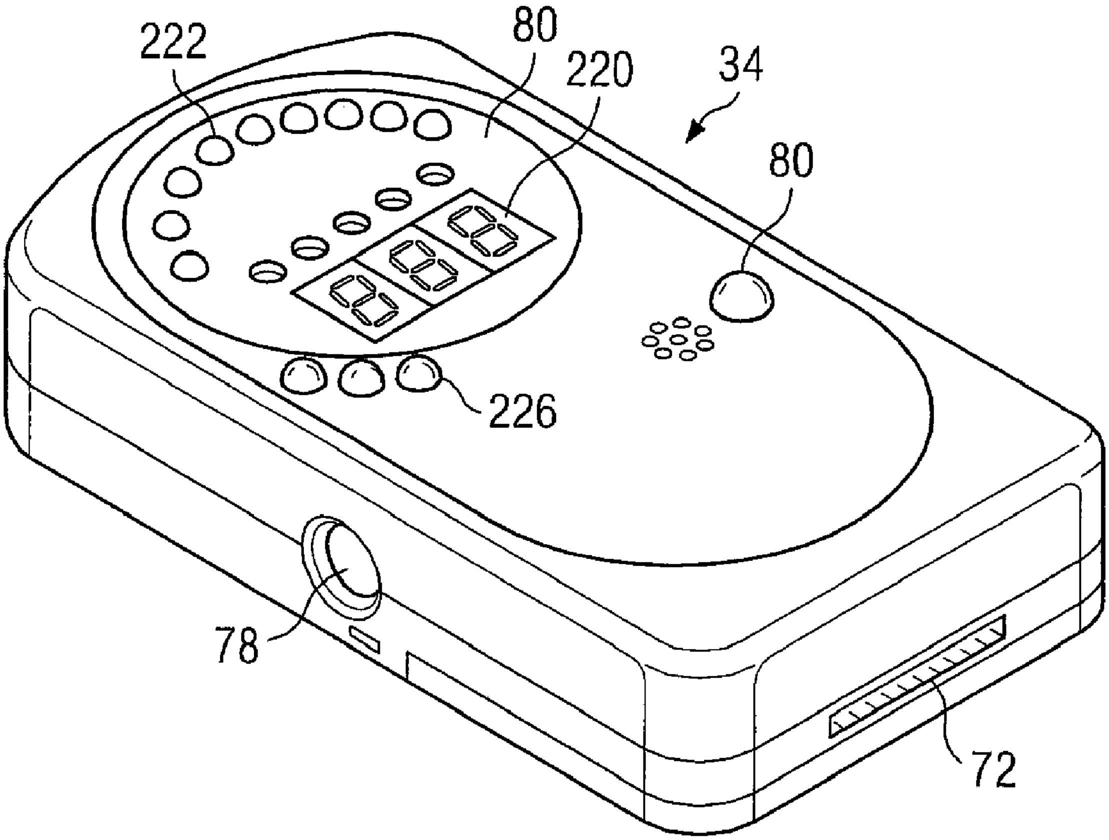
FIG. 13 illustrates the electronic module used as a guitar tuner.

FIG. 13 illustrates electronic module 34 operating as a tuner. In hand-held mode, cable 32 from guitar 12 plugs into jack 78. The tuner may have a microphone input for receiving and measuring the frequency of the audio signals from the guitar. Alternatively, electronic module is inserted into docking station 30. The tuning module has a tuning range from low bass G0 through high treble C8. Electronic module 34 has an auto-calibration feature with a calibration range from 435 to 445 Hz and a detection accuracy of +/−1%. The unit can also be battery powered. Display area 80 has a numeric readout 220 which provides the frequency in Hertz of the guitar string.

During the tuning process, when guitar string 14 is played, the audio signal from the string vibration is transmitted through cable 32 and docking station 30 to electronic module 34. The frequency of the string vibration is displayed in numeric readout 220. A first string is intended to produce an E note and has a resonant frequency of 82.4 Hz; a second string is intended to produce an A note and has a resonant frequency of 110 Hz; a third string is intended to produce a D note and has a resonant frequency of 146.83 Hz; a fourth string is intended to produce a G note and has a resonant frequency of 195.99 Hz; a fifth string is intended to produce a B note and has a resonant frequency of 246.94 Hz; a sixth string is intended to produce an E note and has a resonant frequency of 329.62 Hz. The user can adjust machine heads 22 to change the string tension until the properly tuned frequency is displayed.

Consider one exemplary process of tuning guitar 12. The user kicks one of the foot-operated pushbuttons to select the tuning frequency for the first guitar string. The user plays the first guitar string. The frequency of the first string appears on numeric readout 220. The user adjusts the machine head 22 associated with the first guitar string. The user plays the first guitar string again. The process repeats until the numeric readout for the first guitar string is 82.4 Hz, which is the desired tuned frequency for the first string.

The tuning process continues to the second guitar string. The user kicks the foot-operated pushbutton again to select the tuning frequency for the second guitar string. The user plays the second guitar string. The frequency of the second string appears on numeric readout 220. The user adjusts the machine head 22 associated with the second guitar string. The user plays the second guitar string again. The process repeats until the numeric readout for the second guitar string is 110 Hz, which is the desired tuned frequency for the second string. The same tuning process is repeated for the third, fourth, fifth and sixth guitar strings.

Display area 80 may further include indicator 222 for showing dynamic ranges and scaling. LED 224 is an electric power indicator. LEDs 226 indicate one or more functions associated with electronic module 34. Connector 72 mates with the corresponding terminal in receptacle 52 of docking station 30.

A feature of the present invention is the electronic module 34 with can be used with a variety of receiving devices, e.g., amplifier and speaker system, musical instrument, docking station, mixing board, and computer system, either by inserting the module into a receptacle or using the module in hand-held mode with the receiving devices. The same electronic module is mechanically and electrically compatible with each of these receiving devices. The electronic module is readily transferable between receiving devices and programmable to operate with each type of receiving device. Thus, the user can move the electronic module from one device to another and maintain the same data, programming options, sound synthesis. For example, the user can insert electronic module 34 into computer 202 or mixing board 212 customize various sounds. The sounds are stored as MIDI files in electronic module 34. The module can plugged into amplifier and speaker system 35 or guitar 12 and utilize the synthesizer and DSP function to generate any desired sound. One electronic module performs substantially all the functions needed by the user to operate the musical instrument as well as associated equipment. The electronic circuit receives user commands from the control panel, displaying configuration information on the display, and performs a variety of functions for each of the receiving devices.

While one or more embodiments of the present invention have been illustrated in detail, the skilled artisan will appreciate that modifications and adaptations to those embodiments may be made without departing from the scope of the present invention as set forth in the following claims.

What is claimed is:

1. An electronic module for use in conjunction with a musical instrument, comprising:

an enclosure with connector adapted for mechanical and electrical compatible insertion into a receptacle of first and second receiving devices each having a function usable in conjunction with the musical instrument, the function of the second receiving device being different from the function of the first receiving device;

an audio input coupled for receiving an audio signal;

a digital input coupled for receiving musical instrument digital interface (MIDI) data;

a programmable control panel and display disposed on the enclosure; and an electronic circuit disposed within the enclosure and receiving user commands from the control panel and displaying configuration information on the display, the electronic circuit including, (a) an analog to digital converter coupled to the audio input for receiving the audio signal and providing a digital audio signal, (b) a microcontroller coupled for receiving the MIDI data and controlling routing of the MIDI data, (c) a synthesizer coupled to the microcontroller for receiving the MIDI data and generating a synthesized audio signal, the MIDI data containing information which is processed by the synthesizer to produce sound content of a first musical instrument or vocals contained in the synthesized audio signal, (d) a digital signal processor (DSP) coupled for receiving the digital audio signal and synthesized audio signal and generating a digital audio output signal based on signal processing of the digital audio signal and synthesized audio signal, the digital audio output signal being routed to an audio output of the electronic circuit, and (e) a memory coupled to the DSP, the memory storing the digital audio signal and MIDI data.

2. The electronic module of claim 1, wherein the electronic circuit provides at least one feature selected from the group consisting of equalizer, fully chromatic tuner, phrase sampler, phrase trainer, play loops, MIDI file support, variable speed playback, sample recording, sound selection, and style selection.

3. The electronic module of claim 1, wherein the first and second receiving devices are selected from the group consisting of foot-operated docking station, portable amplifier and speaker system, and musical instrument.

4. The electronic module of claim 3, wherein the musical instrument is a guitar.

5. An electronic module for use in conjunction with a musical instrument, comprising:

an enclosure with a connector which is mechanically and electrically compatible with first and second receiving devices each having a function usable in conjunction with the musical instrument, the function of the second receiving device being different from the function of the first receiving device;

an audio input coupled for receiving an audio signal;

a digital input coupled for receiving musical instrument digital interface (MIDI) data;

a programmable control panel and display disposed on the enclosure; and an electronic circuit disposed within the enclosure and receiving user commands from the control panel and displaying configuration information on the display, the electronic circuit including, (a) a synthesizer coupled for receiving the MIDI data and generating a synthesized audio signal, the MIDI data containing information which is processed by the synthesizer to produce sound content of a first musical instrument or vocals contained in the synthesized audio signal, (b) a digital signal processor (DSP) coupled for receiving the audio signal and synthesized audio signal and generating an audio output signal based on signal processing of the audio signal and synthesized audio signal, the audio output signal being routed to an output of the electronic circuit, and (c) a memory coupled to the DSP, the memory storing the audio signal and MIDI data.

6. The electronic module of claim 5, wherein the first receiving device is selected from the group consisting of a foot operated docking station, portable amplifier and speaker system, and musical instrument.

7. The electronic module of claim 5, wherein the first musical instrument is selected from a group consisting of a string instrument, brass, woodwind, percussions, or keyboard.

8. The electronic module of claim 5, wherein the signal processing within the DSP includes at least one feature selected from the group consisting of equalizer, fully chromatic tuner, phrase sampler, phrase trainer, play loops, MIDI files, variable speed playback, sample recording, sound selection, and style selection.

9. The electronic module of claim 5, wherein the enclosure connects to the first receiving device via a cable.

10. A method of providing signal processing for a musical instrument, comprising:

providing an electronic module having an enclosure which is mechanically and electrically compatible with first and second receiving devices each having a function usable in conjunction with the musical instrument, the function of the second receiving device being different from the function of the first receiving device receiving user commands from a control panel on the enclosure and displaying configuration information;

generating a synthesized audio signal in response to musical instrument digital interface (MIDI) data, the MIDI data containing information which is processed by the synthesizer to produce sound content of a first musical instrument or vocals contained in the synthesized audio signal;

generating an audio output signal based on digital signal processing of the synthesized audio signal and an audio signal; and storing the MIDI data and audio signal in a memory.

11. The method of claim 10, wherein the first musical instrument is selected from a group consisting of a string instrument, brass, woodwind, percussions, or keyboard.

12. The method of claim 10, wherein the signal processing includes at least one feature selected from the group consisting of equalizer, fully chromatic tuner, phrase sampler, phrase trainer, play loops, MIDI files, variable speed playback, sample recording, sound selection, and style selection.

13. The method of claim 10, wherein the first receiving device is selected from the group consisting of a foot operated docking station, portable amplifier and speaker system, and musical instrument.

* * * * *